United States Patent
Katz

(10) Patent No.: US 7,761,380 B2
(45) Date of Patent: Jul. 20, 2010

(54) SYSTEM AND METHOD FOR AUTHENTICATING A PAYMENT INSTRUMENT TRANSACTION ORIGINATING FROM A NON-INTERNET CHANNEL

(75) Inventor: Matthew Katz, Beverly Hills, CA (US)

(73) Assignee: Verifi, Inc., Los Angeles, CA (US)

(*) Notice: Subject to any disclaimer, the term of this patent is extended or adjusted under 35 U.S.C. 154(b) by 0 days.

(21) Appl. No.: 11/906,441

(22) Filed: Sep. 28, 2007

(65) Prior Publication Data

US 2008/0126252 A1 May 29, 2008

Related U.S. Application Data

(60) Provisional application No. 60/827,409, filed on Sep. 28, 2006.

(51) Int. Cl.
*G06Q 40/00* (2006.01)
(52) U.S. Cl. .................................. 705/44; 705/65
(58) Field of Classification Search ............... 705/1, 705/44, 74, 39, 64, 67, 50, 76, 54, 26, 65, 705/42, 75, 13; 235/380, 472; 713/182, 713/155, 172
See application file for complete search history.

(56) References Cited

U.S. PATENT DOCUMENTS

2002/0143655 A1* 10/2002 Elston et al. ................ 705/26
2002/0194138 A1* 12/2002 Dominguez et al. ......... 705/64
2005/0246278 A1 11/2005 Gerber et al.

FOREIGN PATENT DOCUMENTS

WO 2008042252 A3 10/2008

OTHER PUBLICATIONS

Security Control in Inter-Bank Fund Transfer By: Dan Zhu Department of Logistics, Operations and MIS Iowa State University; Journal of Electronic Commerce Research, vol. 3, No. 1, 2002.*

* cited by examiner

*Primary Examiner*—James P Trammell
*Assistant Examiner*—John H Holly
(74) *Attorney, Agent, or Firm*—Connolly Bove Lodge & Hutz LLP

(57) ABSTRACT

A system and method for use in the authentication of payment instrument non-Internet transactions. A server transmits the transaction information to the authentication network associated with the issuer of the cardholder's card to determine whether the cardholder is enrolled in the card issuer's authentication program, and if so, will transmit a notification to the cardholder which includes instructions on how the cardholder can use an Internet connection to complete the authentication process for the transaction. When the cardholder accesses the server website and inputs the verification code previously generated by the server, the cardholder is automatically redirected by the server to the specific Internet link provided by the authentication network, which corresponds to the cardholder's transaction, so that the cardholder may complete the authentication of the transaction.

18 Claims, 4 Drawing Sheets

SYSTEM AND METHOD FOR AUTHENTICATING A PAYMENT INSTRUMENT TRANSACTION ORIGINATING FROM A NON-INTERNET CHANNEL

CROSS-REFERENCE TO RELATED APPLICATIONS

This application claims priority to, and incorporates by reference, U.S. provisional patent application Ser. No. 60/827,409, filed Sep. 28, 2006.

TECHNICAL FIELD

The current invention relates to a system and method for authenticating a traditional non-Internet based transactions, such as mail, telephone, fax, email, in-person ("card-present") transactions made with a credit card or other payment instrument.

BACKGROUND OF THE INVENTION

Credit cards and other or other payment instruments, such as debit cards, check cards, and automatic teller machine (ATM) cards, are widely used by holders to purchase goods and services in the marketplace and to obtain access to funds and information. It is projected that at least 35% of all U.S. cardholder payments in 2007 will be made via "plastic" (i.e., a credit or debit card), and it is estimated that this rate will increase to at least 49% by 2010. The current annual value of these transactions exceeds 400 billion dollars. While credit card transactions are convenient for cardholders, they present a special set of problems for merchants and credit card issuers. One such problem occurs when a cardholder disputes a credit card transaction, resulting in a "chargeback" to the merchant with whom the transaction was made.

To understand the problem presented by chargebacks, a brief overview of the economics behind credit cards is required. Credit cards are provided to a cardholder by an issuing bank. When a cardholder enters into a transaction with a merchant using the credit card, the issuing bank commits to pay the merchant at the time the transaction is verified. For in person transactions, verification occurs through the magnetic strip on the back of the credit card, and for transactions where the physical card is not present by software driven systems, such as "Verified by Visa," which compare information received during the transaction to the user's account information. In return for providing credit card service to a merchant, the issuing bank charges the merchant a commission, called a discount fee, on each completed credit card transaction.

Each month, the credit card user is sent a statement documenting the purchases made with the card, and the total balance owed. According to the Fair Credit Billing Act the cardholder can dispute any charges on the statement that he or she thinks are incorrect. A chargeback occurs when a credit card holder contacts the issuing bank and disputes a purchase that the cardholder made on his/her credit card. The reasons why chargebacks occur vary, but most are due to a defective product, fraud, or the cancellation of an automatic recurrent payment. The cardholder may or may not have contacted the merchant about remedying the situation before contacting the issuing bank.

The chargeback process varies somewhat from credit card company to credit card company, but generally follows the sequence shown in FIG. 1. At step 1, a credit card holder disputes a transaction with their issuing bank. At step 2, the issuing bank investigates to determine whether the chargeback request is valid, and if it is not, denies the chargeback. At step 3, a provisional credit representing the amount charged is placed back in the user's account. At step 4, the issuing bank initiates a chargeback process and obtains credit representing the chargeback purchase from the merchant's bank. At step 5, the merchant's bank investigates the chargeback request to determine if it is valid, and, if not, the chargeback is returned to the issuing bank. If the merchant's bank determines the chargeback is valid, at step 6, the chargeback amount is removed from the merchant's bank account, and the merchant's bank provides written notice to the merchant. At step 7, the merchant is given an opportunity to refute the chargeback, and, if its documentation is satisfactory, the chargeback is declined and the cardholder is once again charged for the sale. If the chargeback is not declined, the chargeback is successful and the process is completed.

Merchants seek to reduce the number of chargebacks as much as possible because each chargeback results in losses to the merchant in the form of lost profit for refunded sales, shipping and handling fees, and the loss of productivity attributed to handling the disputes. Clearly the chargeback process is also expensive for the banks. Therefore, the frequency of chargebacks affects the amount of the commission charged by credit card issuers for each credit card transaction. If a merchant has a high frequency of chargebacks, the commission charged by a credit card issuer increases. If the frequency of chargebacks reaches certain level, such as more than 1% of total sales, the credit card issuer may completely terminate the merchant's account. In such an instance, the merchant is added to a Terminated Merchant File (also called the Match File) that effectively prevents the merchant from being allowed to accept credit cards as a form of payment. Needless to say this can be very deleterious to the merchant's business.

While completely preventing chargebacks is impossible, there are several ways to decrease the frequency of chargebacks, including: credit card verification/authentication services; reliable product delivery, responsive cardholder service, institution of dispute and refund procedures, and risk assessment of potential cardholders. The current invention seeks to reduce the frequency of chargebacks by improving a merchant's verification and authentication capabilities.

SUMMARY

The current invention improves a merchant's authentication and verification capabilities by providing a system and method for authorizing a traditional non-Internet based transactions, such as mail, telephone, fax, email, in-person ("card-present") transactions using credit cards and other or other payment instruments, such as debit cards, check cards, and automatic teller machine (ATM) cards using procedures principally tailored for Internet transactions. Such Internet based transactions are more reliable and secure than mail, telephone, fax, email, card-present, mail or email orders because they can utilize a payment instrument issuer's authentication programs, such as Visa's "Verified by Visa," or MasterCard's "SecureCode." The present invention provides a system and method to conduct the authentication of the payment instrument holder's non-Internet transactions.

As is commonly known in the art, authentication programs require the payment instrument holder to submit a personal credential, such as a password, finger print, digital certificate or other identification means, directly to the payment instrument issuer. The Authentication programs require a direct payment instrument holder to payment instrument issuer interaction to ensure that the authentication information is only exchanged between these two parties so that the confidentiality of the credential is maintained as required by the Authentication protocols. Commonly used Authentication programs, such as Verified by Visa and MasterCard SecureCode, prohibit the cardholder from disclosing their password to a third party (order clerk) to complete authentication on behalf of the cardholder. This disclosure of the cardholder's confidential credential (password, finger print, voiceprint, digital certificate or other unique and confidential identifier) to a third party would violate the Authentication protocols.

Further, the outcome of the authentication process provides an additional factor to use in the verification of the order, for example, whether the payment instrument holder successfully provided their password, indicating that this transaction is non-fraudulent, or were they unsuccessful in providing their password, thus indicating that the cardholder may not be the true owner of that payment instrument.

Moreover, a transaction authenticated by a credit card issuer's authentication program will not be charged back to the merchant on the basis of fraud. If, however, a merchant enters into a transaction with a cardholder using a credit card and does not implement the credit card issuer's authentication technology, then the merchant, not the credit card issuer, will be responsible for the fraudulent charges associated with the transaction. As a result, it is preferable for a merchant to utilize e-commerce transactions with its cardholders so as to claim the benefit of the credit card issuers' respective authentication programs.

However, many of a merchant's cardholders may not have timely access to the Internet, or may not be experienced or comfortable enough with use of the Internet to enter into an e-commerce transaction. The current inventive method and/or system addresses this problem by allowing conversion of a card-present, mail or telephone order transaction information into an e-commerce transaction. After conversion into an e-commerce transaction, the current invention submits a confirmation communication to the cardholder, which provides the transaction information to the cardholder. Also, by providing a communication link, such as an Internet link, the confirmation communication provides the cardholder the capability to communicate directly with the Card Issuing Bank to utilize the Authentication program for the transaction. According to the invention when a cardholder calls a merchant to place a telephone order for goods or services, the merchant gives the cardholder the option of completing the transaction electronically, for example, via an email, text message, instant message, computerized voice over the telephone (IVR) or other electronic message system. If the cardholder elects to complete the transaction according to one of these means, the transaction can be converted into an e-commerce transaction and can be processed by the issuing credit cards authentication program. If the transaction passes the authentication process, the merchant will be protected from chargebacks attributed to fraud for that particular transaction.

In one preferred embodiment, shown in FIG. 2, the system and method of the present invention are illustrated. The payment instrument holder initiates a non-Internet based credit card transaction, such as by telephone, fax, mail order, e-mail, or in-person. The cardholder may submit transaction information, such as product or service desired, and payment and billing information by mail, fax, email, in-person, or by telephone, through the touchtone keypad of the phone, or by responding orally wherein the system utilizes voice recognition software (IVR) to convert voice data into computer readable data.

The merchant or device associated with the merchant terminal, such as a scanner or IVR system, inputs the transaction information into the merchant terminal.

The merchant terminal sends a transaction request to the server for processing. This request includes the transaction data that is required for authorization of the transaction, such as credit card number, transaction amount, credit card expiration date and merchant identification.

The server transmits the transaction information to the authentication network associated with the issuer of the cardholder's card to determine whether the cardholder is enrolled in the card issuer's authentication program.

If the cardholder is enrolled in the card issuer's authentication program, the authentication network retains the transaction information, assigns a unique payer authentication request (PAR) to the transaction. The PAR is typically an encrypted XML string. The authentication network sends a response to the server confirming the cardholder's enrollment, and providing the PAR and an Internet link which correspond to the specific transaction. The cardholder must use the PAR and Internet link to authenticate the transaction.

If the cardholder is not enrolled in the card issuer's authentication program, the authentication network will send a response to the server that the cardholder is not enrolled. Upon receipt of this response, the server may transmit a notice to the merchant that the cardholder is not enrolled. Additionally or alternatively, the server may transmit or may instruct the merchant terminal or other device to transmit, a notification to the cardholder by email, telephone call, SMS message, fax, mail or other communication means that the cardholder is not enrolled in the card issuer's authentication program.

Upon receipt of the affirmative enrollment response, the server may transmit, or may instruct the merchant terminal or other device to transmit, a notification to the cardholder by email, telephone call, SMS message, instant message, fax, mail, or other communication means. This notification will include instructions on how the cardholder can use an Internet connection to complete the authentication process for the transaction.

In one preferred embodiment, the cardholder is directed to access a URL for a website connected to the server. The cardholder is also provided a unique verification code generated by the server for identification of the cardholder's transaction or, alternatively, the URL itself may provide a link to the specific transaction. When the cardholder accesses the server website and, if necessary, inputs the verification code previously generated by the server, the cardholder is redirected by the server to the specific Internet link provided by the authentication network, which corresponds to the cardholder's transaction, so that the cardholder may complete the authentication of the transaction. The server also reinitiates transmission of the transaction information to the authentication network associated with the issuer of the cardholder's card to request a determination as to whether the cardholder is enrolled in the card issuer's authentication program and to receive a new and more timely payer authentication request (PAR) for the transaction. The server then discards the stored PAR previously received from the authentication network and attaches the newly-received PAR from the authentication network to the cardholder's communication with the authentication network, which is required to complete the authentication of the transaction.

The Cardholder may then complete the authentication process by providing the unique confidential credential (password, finger print, voiceprint, digital certificate or other unique and confidential identifier) associated with the cardholder's credit card.

In another preferred embodiment, the cardholder is provided an e-mail containing the Internet link and the PAR received from the authentication network which correspond to the specific transaction, thus allowing the cardholder to directly access the cardholder's transaction at the authentication program website.

Upon successful completion of the authentication process, the authentication program provides a notification to the server, including a CAVV cardholder authentication verification value unique to the transaction which is generated by the authentication network to indicate authentication of the transaction. The server may provide the CAVV to the merchant terminal to confirm the authentication of the cardholder's transaction.

Upon successful completion of the authentication process, either the server or the merchant terminal may then submit the transaction information to the credit card payment network to obtain financial authorization on the transaction. This request for authorization will include the CAVV. This submission may be accomplished for each individual transaction or by batch transmission at predetermined intervals, and the responses to these authorization requests may be transmitted to the merchant terminal in a similar manner. Conversely, if the cardholder was unable to successfully complete the authentication process, this may provide an indication to the merchant as to the cardholders entitlement to legitimate use of the card.

Upon successful completion of the financial authorization on the transaction, the merchant may complete the transaction with the cardholder by providing the purchased goods or services.

DETAILED DESCRIPTION OF THE PREFERRED EMBODIMENTS

Figure 1:
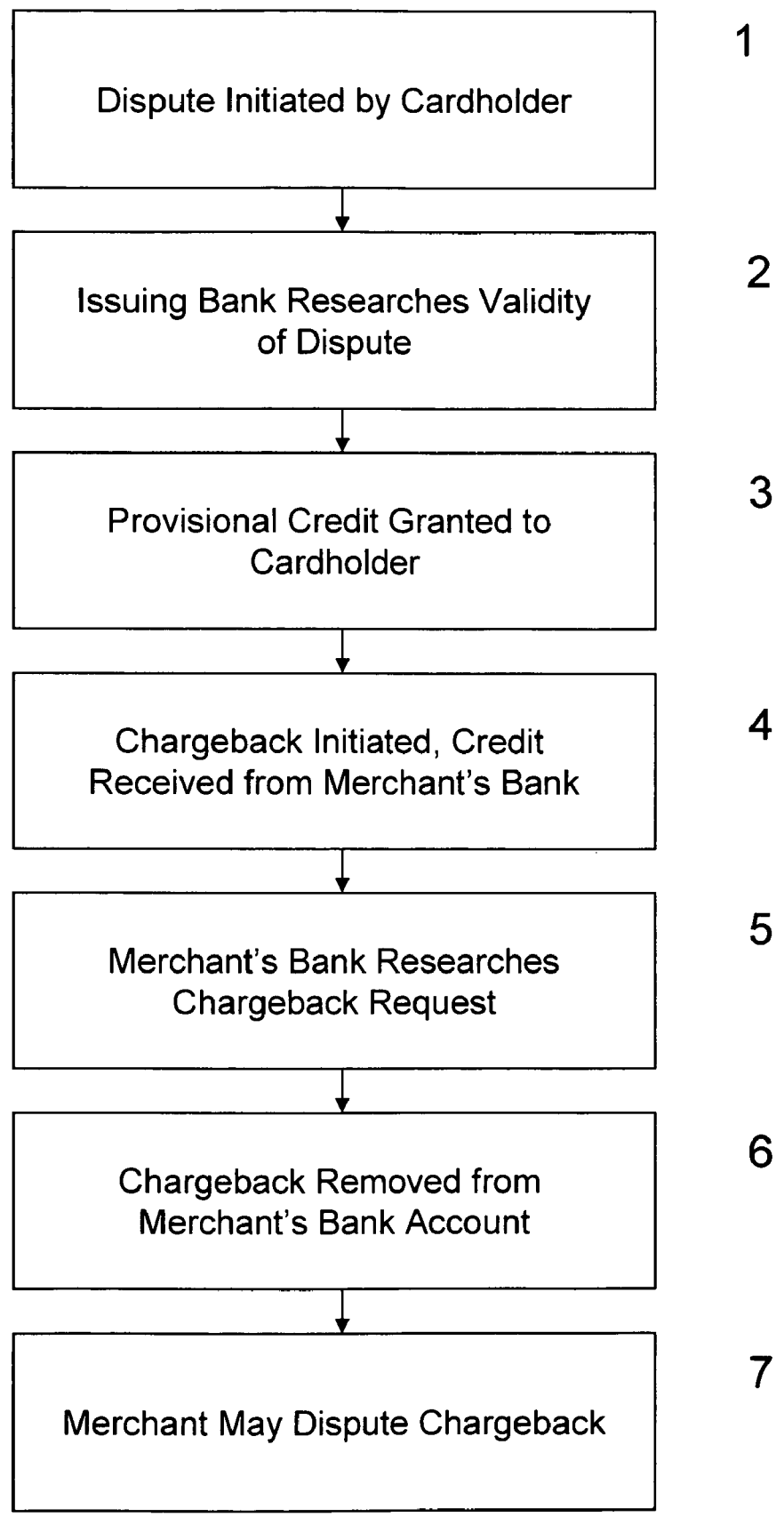
FIG. 1 is a simplified diagram illustrating the chargeback process.

Reference is now made to the figures in which like reference numerals refer to like elements.

In the following description, certain specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc.

In some cases, well-known structures, materials, or operations are not shown or described in detail in order to avoid obscuring aspects of the invention. Furthermore, the described features, structures, or characteristics may be combined in any suitable manner in one or more embodiments.

Figure 2:
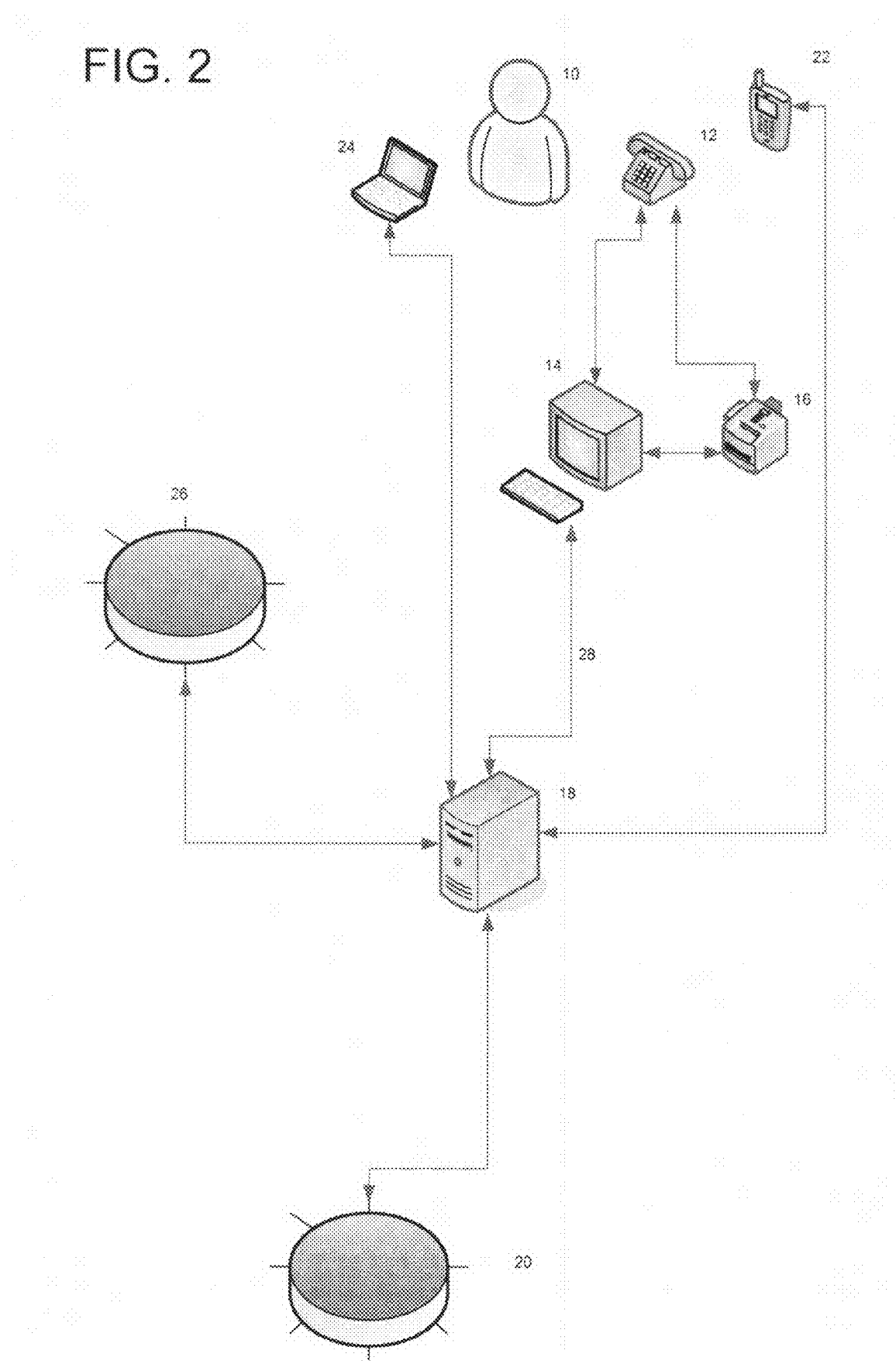
FIG. 2 is a simplified diagram illustrating the system components of a preferred embodiment of the present invention.

In one preferred embodiment, shown in FIG. 2, the system and method of the present invention are illustrated.

The system of the present invention preferably includes a server 18, which is linked to a merchant's computer terminal 14 by an application programming interface on merchant's order management system. Typical order management system systems may include a "shopping cart" function for collecting and managing transaction information and may additionally include a credit card transaction authorization function. The interface obtains transaction details necessary to implement the authentication process, including credit card number, credit card expiration date, transaction amount and merchant identification, such as merchant number, URL, or merchant acquirer bank identification.

The interface preferably is connected to the server by data transmission link, such as the Internet. The interface may transfer transaction data to the server in batch files using FTP, SFTP of FTPS protocol, or may transfer single transaction records using HTTP or HTTPS format. The server is connected via the Internet or other communication network to authentication program servers 20 and payment authorization providers 26.

Alternatively, the system of the present invention may be operated on the merchant's computer 14 which is connected via the Internet or other communication network to authentication program servers 20 and payment authorization providers 26.

The cardholder 10 initiates a non-Internet based credit card transaction, such as by telephone 12, fax, mail order, e-mail 22 or 24, or in-person The cardholder may submit transaction information, such as product or service desired, and payment and billing information by mail, fax, email, in-person, of by telephone, through the touchtone keypad of the phone, or by responding orally wherein the system utilizes voice recognition software (IVR) 16 to convert voice data into computer readable data.

The merchant or an input device associated with the merchant terminal, such as a scanner or IVR system 16, inputs the transaction information into the merchant terminal.

The merchant terminal 14 sends a transaction request to the server 18 for processing. This request includes the transaction data that is required for authorization of the transaction, such as credit card number, transaction amount, credit card expiration date and merchant identification.

The server 18 transmits the transaction information to the authentication network 20 associated with the issuer of the cardholder's card to determine whether the cardholder 10 is enrolled in the card issuer's authentication program.

If the cardholder is enrolled in the card issuer's authentication program, the authentication network 20 retains the transaction information, assigns a unique payer authentication request (PAR) to the transaction. The PAR is typically an encrypted XML string. The authentication network 20 sends a response to the server 18 confirming the cardholder's enrollment, and providing the PAR and an Internet link which correspond to the specific transaction. The cardholder 10 must use the PAR and Internet link to authenticate the transaction.

Alternatively, if the cardholder is not enrolled in the card issuer's authentication program, the authentication network 20 will send a response to the server that the cardholder is not enrolled. Upon receipt of this response, the server 18 may transmit a notice to the merchant terminal 14 that the cardholder is not enrolled. Additionally or alternatively, the server 18 may transmit or may instruct the merchant terminal 14 or other instrumentality, such as IVR system 16 to transmit, a notification to the cardholder 10 by email, telephone call, SMS message, fax, mail or other communication means that the cardholder is not enrolled in the card issuer's authentication program.

Upon receipt of the affirmative enrollment response, the server 18 may transmit, or may instruct the merchant terminal 14 or other instrumentality to transmit, a notification to the cardholder by email, telephone call, SMS message, instant message, fax, mail, or other communication means. This notification will include instructions on how the cardholder 10 can use a computer 26 having an Internet connection to complete the authentication process for the transaction.

In one preferred embodiment, the cardholder is directed to access a URL for a website connected to the server. The cardholder is also provided a unique verification code generated by the server for identification of the cardholder's transaction. When the cardholder accesses the server website 18 and inputs the verification code previously generated by the server, the cardholder is automatically redirected by the server to the specific Internet link address on the authentication network 20, which corresponds to the cardholder's transaction, so that the cardholder may complete the authentication of the transaction. The server also reinitiates transmission of the transaction information to the authentication network associated with the issuer of the cardholder's card to request a determination as to whether the cardholder is enrolled in the card issuer's authentication program and to receive a new and more timely payer authentication request (PAR) for the transaction. The server then discards the stored PAR previously received from the authentication network and attaches the newly-received PAR from the authentication network to the cardholder's communication with the authentication network, which is required to complete the authentication of the transaction.

The Cardholder may then complete the authentication process by providing the unique confidential credential (password, finger print, voiceprint, digital certificate or other unique and confidential identifier) associated with the cardholder's credit card.

In another preferred embodiment, the cardholder is provided an e-mail containing the Internet link and the PAR received from the authentication network which correspond to the specific transaction, thus allowing the cardholder to directly access the cardholder's transaction at the authentication program website 20.

Upon successful completion of the authentication process, the authentication program 20 provides a notification to the server 18, including a CAVV cardholder authentication verification value unique to the transaction which is generated by the authentication network to indicate authentication of the transaction.

The server 18 may provide the CAVV to the merchant terminal 14 to confirm the authentication of the cardholder's transaction.

Upon successful completion of the authentication process, either the server 18 or the merchant terminal 14 may then submit the transaction information to the credit card payment network 26 to obtain financial authorization on the transaction. This request for authorization will include the CAVV. This submission may be accomplished for each individual transaction or by batch transmission at predetermined intervals, and the responses to these authorization requests may be transmitted back to the server 18 or merchant terminal 14 in a similar manner.

Upon successful completion of the financial authorization on the transaction, the merchant may complete the transaction with the cardholder by providing the purchased goods or services.

The inventive system or method of the present invention can convert a telephone order transaction into an Internet transaction in a variety of ways. In one embodiment, shown in FIG. 3, an automated telephone order system allows the cardholder to enter transaction information, such as product or service desired, and payment and billing information. The cardholder may input this information through the touchtone keypad of the phone, or by responding orally wherein the system utilizes voice recognition software to convert voice data into computer readable data. After the cardholder enters transaction information, a computerized voice may summarize the order information back to the user so that the user can confirm the transaction details to execute the order. In alternate embodiments, the cardholder may be sent confirmation via email, text message or other electronic messaging system. If the order information is incorrect, the cardholder can edit the transaction information prior to executing the order electronically. Alternatively, the automated telephone order system may directly provide a means for the cardholder to enter the required password. As a result, the authenticated transaction can claim the benefit of the credit card's authentication program. If the transaction is successfully authenticated, the merchant can then begin processing the transaction with assurance that the credit card company will be responsible for chargebacks attributable to a fraudulent transaction.

Figure 3:
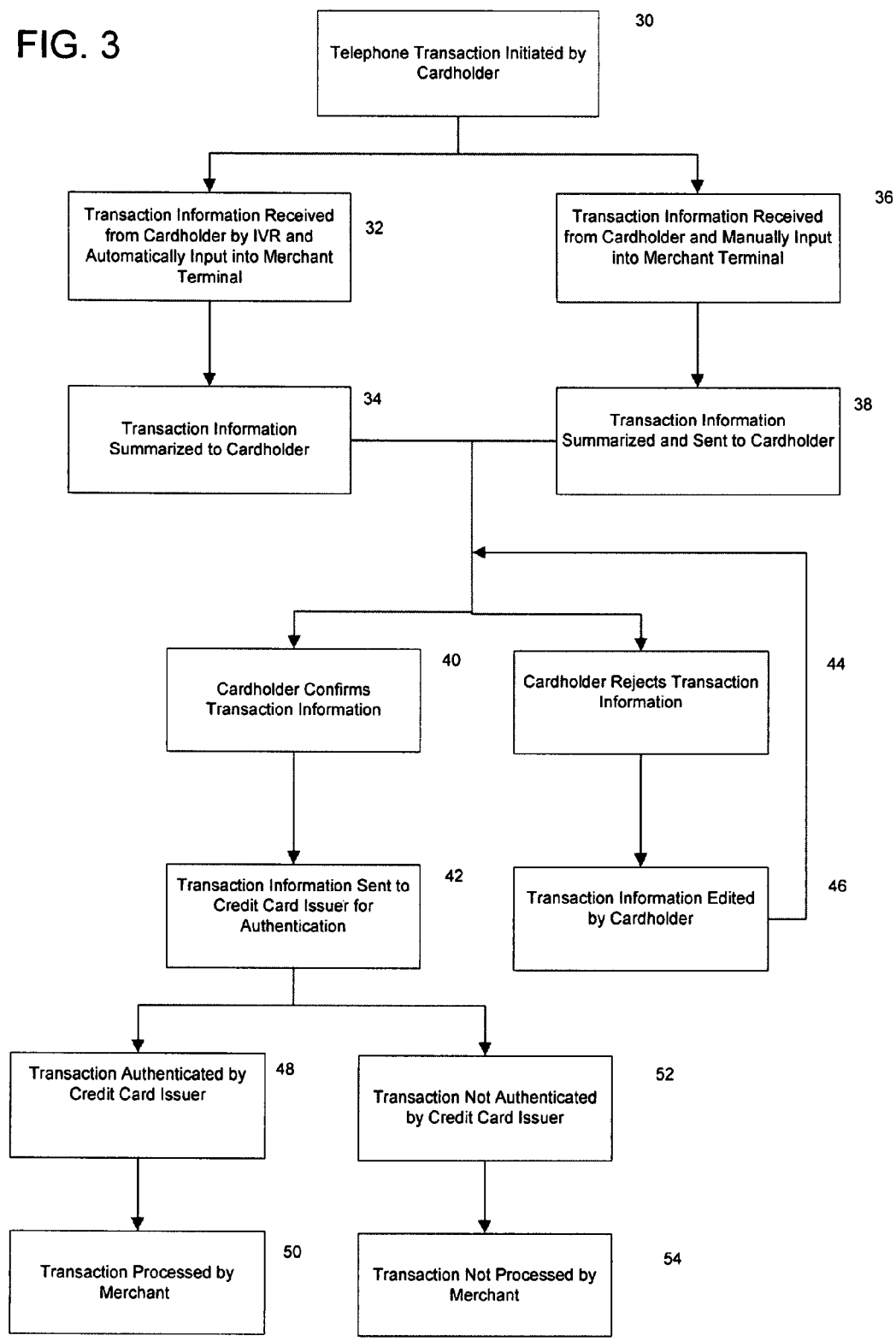
FIG. 3 is a flow diagram which illustrates certain methodologies in accordance with the present invention.

In an alternate embodiment, also shown in FIG. 3, there is no fully automated telephone order system. Transaction information is manually entered into the merchant terminal by the merchant. The merchant can then indicate that the transaction will be completed electronically, either at the cardholder's election or automatically, and transaction information is forwarded to the cardholder via an electronic message, such as email, text message, instant message, automated voice over telephone, or some other equivalent. A benefit of sending the transaction information to a user via text messages or automated voice over telephone is that the transaction message will not be blocked b an email's spam filter. Once the electronic message containing the transaction details is received by the cardholder, the cardholder may confirm the transaction, or they may edit the transaction information. In one embodiment, the transaction will (automatically be confirmed after a predetermined time period if the cardholder does not respond to the electronic confirmation message. In an alternative embodiment, the transaction will automatically be denied after a predetermined time period if the cardholder does not respond to the electronic confirmation message.

If the transaction details are edited by the cardholder, the new transaction information is sent back to the merchant who then updates the transaction information, and resends an electronic message to the cardholder containing the new transaction details. If the cardholder confirms the new transaction details, the electronic order will be forwarded to the issuing credit card company for authentication.

Figure 4:
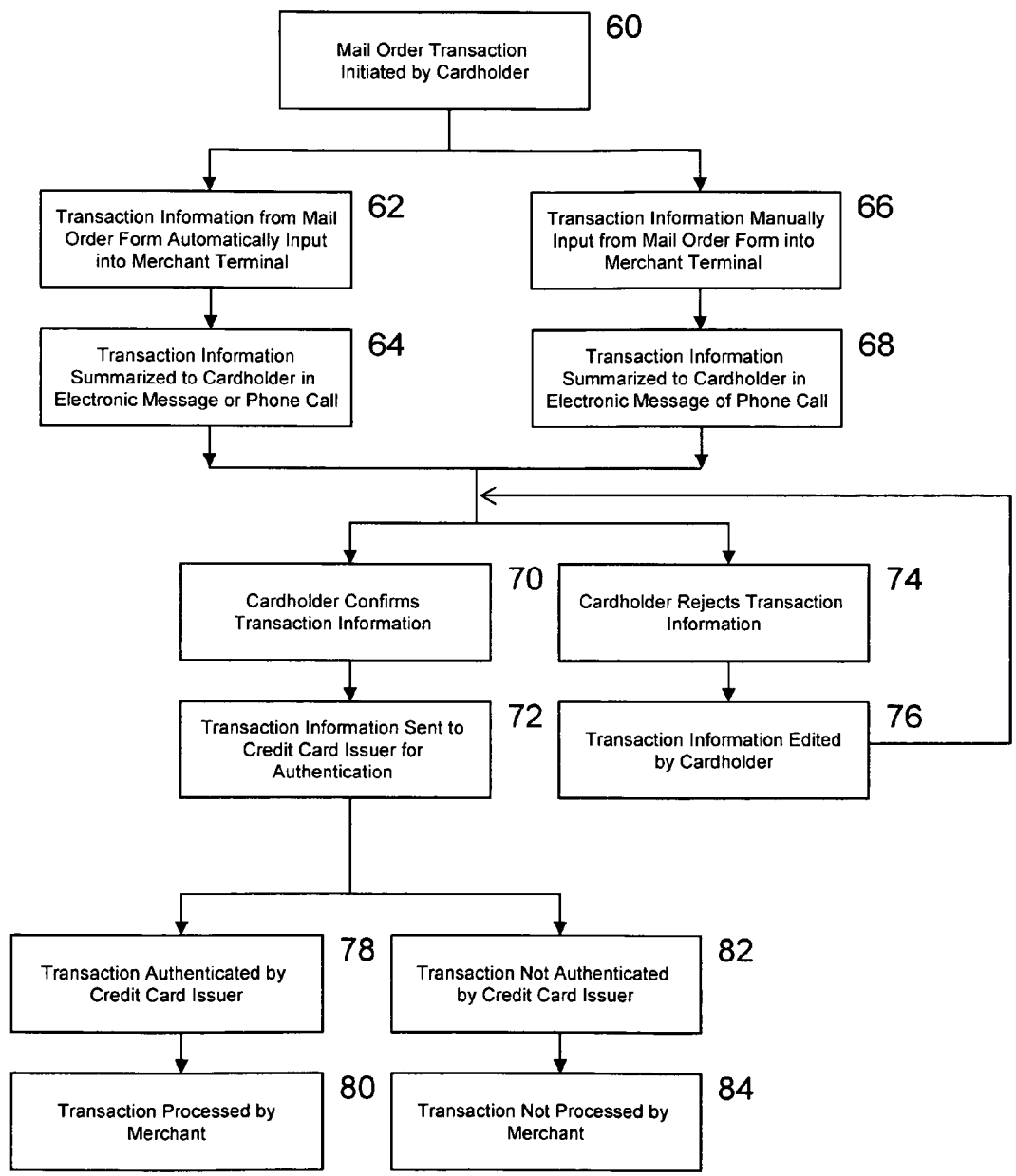
FIG. 4 is a flow diagram which further illustrates certain methodologies in accordance with the present invention.

The inventive system and method can also convert a mail order transaction into an Internet transaction. In one embodiment shown in FIG. 4, a cardholder initiates a mail order transaction with a merchant by mailing in an order form to the merchant. Upon receipt of the mail order form, the merchant manually inputs the transaction information which is then formatted and transmitted in an electronic form, such as in an email or text message, or by using software to convert the inputted text into an automated voice over telephone message which is sent to the cardholder using automated telephone dialing. Alternatively, the merchant may scan the mail order form and use optical character recognition software to automatically input transaction information into an electronic format. An electronic message, may then be sent to the cardholder for confirmation of the mail order transaction. When the cardholder confirms the transaction details, the transaction is then forwarded to the cardholder's credit card issuer electronically for authentication.

As described above, the inventive method and system provides a way for merchants to process non-Internet based transactions, such as telephone or mail order transactions. The method/system provides a reliable and secure means for cardholders and merchants to execute these transactions, while reducing the risk that merchant's will be responsible for the losses associated with fraudulent transactions.

It will be obvious to those having skill in the art that many changes may be made to the details of the above-described embodiments without departing from the underlying principles of the invention. The scope of the present invention should, therefore, be determined only by the following claims.

What is claimed is:

1. A system for authenticating a non-Internet payment instrument transaction with a merchant and payment instrument holder, comprising:
    a computer programmed to receive data related to a transaction, to send the transaction data to the payment instrument issuer, to receive authentication data relating to the transaction from the payment instrument issuer; and to send the authentication data to the payment instrument holder, wherein the payment instrument holder uses the authentication data to initiate an Internet authentication communication with the payment instrument issuer.

2. The system of claim 1 wherein the merchant has a terminal and wherein the computer receives data related to the transaction from the merchant terminal.

3. The system of claim 1, wherein the transaction data is input by means selected from the group consisting of: manual input by an operator, voice recognition software, user input via a touchtone phone, or optical character recognition means.

4. The system of claim 1, wherein the computer is programmed to direct a communication to the payment instrument holder comprising a URL for a website.

5. The system of claim 4, wherein the communication is sent by means selected from the group consisting of: email, telephone call, SMS message, fax, and mail.

6. The system of claim 1, wherein the computer is programmed to generate a unique code to identify the transaction.

7. The system of claim 6, wherein the code is used by the payment instrument holder to identify the transaction for authentication.

8. The system of claim 1, wherein authentication data includes a payer authentication request (PAR).

9. The system of claim 8 wherein the computer is programmed to resend the transaction data to the payment instrument issuer at the time the payment instrument holder initiates the authentication communication with the computer, and to receive a second payer authentication request (PAR) relating to the transaction from the payment instrument issuer; and to send the second payer authentication request (PAR) to the payment instrument holder, wherein the payment instrument holder uses the second PAR to initiate a second Internet authentication communication with the payment instrument issuer.

10. A system for authenticating a non-Internet payment instrument transaction with a merchant, comprising a computer programmed to receive data related to a transaction, to send the transaction data to the payment instrument issuer, to receive authentication data relating to the transaction from the payment instrument issuer; to send the authentication data including a payer authentication request (PAR) to the payment instrument holder, wherein the payment instrument holder uses the PAR to initiate an Internet authentication communication with the payment instrument issuer, to resend the transaction data to the payment instrument issuer at the time the payment instrument holder initiates the authentication communication with the computer, to receive a second payer authentication request (PAR) relating to the transaction from the payment instrument issuer; and to send the second payer authentication request (PAR) to the payment instrument holder, wherein the payment instrument holder uses the second PAR to initiate a second Internet authentication communication with the payment instrument issuer.

11. A system for authenticating a non-Internet payment instrument transaction, comprising:
    an authentication network; and
    a server in operative communication with the authentication network, the server being programmed to:
    receive data relating to the transaction;
    send the transaction data to the payment instrument issuer;
    receive authentication data relating to the transaction from the payment instrument issuer; and
    send the authentication data to the payment instrument holder, wherein the payment instrument holder uses the authentication data to initiate an Internet authentication communication with the payment instrument issuer.

12. The system of claim 11, wherein the transaction data is input by means selected from the group consisting of: manual input by an operator, voice recognition software, user input via a touchtone phone, or optical character recognition means.

13. The system of claim 11, wherein the merchant has a terminal and wherein the step of inputting data is performed at the merchant terminal.

14. The system of claim 11, wherein the server is programmed to direct a communication to the payment instrument holder comprising a URL for a website connected to the server.

15. The system of claim 14, wherein the communication is sent by means selected from the group consisting of: email, telephone call, SMS message, fax, and mail.

16. The system of claim 11, wherein the server is programmed to generate a unique code to identify the transaction.

17. The system of claim 16, wherein the code is used by the payment instrument holder to identify the transaction for authentication.

18. The system of claim 11, wherein the server is programmed to:
    resend the transaction data to the payment instrument issuer at the time the payment instrument holder initiates the authentication communication with the server;
    receive a payer authentication request (PAR) relating to the transaction from the payment instrument issuer; and
    send the second PAR to the payment instrument holder, wherein the payment instrument holder uses the PAR to initiate a second Internet authentication communication with the payment instrument issuer.

* * * * *